US009129261B2

United States Patent
Tanaka et al.

(10) Patent No.: US 9,129,261 B2
(45) Date of Patent: Sep. 8, 2015

(54) 3D CHARACTER MAIL SYSTEM

(75) Inventors: Motoyasu Tanaka, Osaka (JP); Yuji Sakai, Kyoto (JP); Hiroyuki Nakajima, Kyoto (JP)

(73) Assignee: MegaChips Corporation, Osaka-shi (JP)

( * ) Notice: Subject to any disclaimer, the term of this patent is extended or adjusted under 35 U.S.C. 154(b) by 1089 days.

(21) Appl. No.: 10/574,548

(22) PCT Filed: Oct. 1, 2004

(86) PCT No.: PCT/JP2004/014472
§ 371 (c)(1),
(2), (4) Date: Feb. 21, 2007

(87) PCT Pub. No.: WO2005/033956
PCT Pub. Date: Apr. 14, 2005

(65) Prior Publication Data
US 2007/0156818 A1    Jul. 5, 2007

(30) Foreign Application Priority Data
Oct. 3, 2003    (JP) ................................. 2003-345863

(51) Int. Cl.
G06F 15/16 (2006.01)
G06Q 10/10 (2012.01)
H04M 1/725 (2006.01)

(52) U.S. Cl.
CPC ......... *G06Q 10/107* (2013.01); *H04M 1/72552* (2013.01); *H04M 1/72544* (2013.01)

(58) Field of Classification Search
CPC  G06Q 10/107; H04L 29/08072; H04L 29/06; H04L 12/585; H04L 12/581
USPC ....................................................... 709/207
See application file for complete search history.

(56) References Cited

U.S. PATENT DOCUMENTS 5,805,783 A *  9/1998  Ellson et al. .................. 345/468
6,073,147 A *  6/2000  Chan et al. .................... 715/234
(Continued)

FOREIGN PATENT DOCUMENTS

| CN | 1364015 A | 8/2002 |
| CN | 1397049 A | 2/2003 |

(Continued)

OTHER PUBLICATIONS

Excerpt from "Generate Definition", Dictionary.com Unabridged, Random House, Inc., accessed Nov. 6, 2009 at <http://dictionary.reference.com/browse/generate>.*

(Continued)

*Primary Examiner* — Dustin Nguyen
*Assistant Examiner* — Joel Mesa
(74) *Attorney, Agent, or Firm* — Oblon, McClelland, Maier & Neustadt, L.L.P.

(57) ABSTRACT

The present invention has an object to enrich expression of contents of an e-mail message. In a mobile phone (1), text data (TxD) is input, and a 3D authoring operation is carried out. The text data (TxD) and 3D authoring instruction data (DD) are transmitted from the mobile phone (1) to a server (3), and then, scenario data (SD) which is control information about 3D graphics is generated in the server (3). The text data (TxD) and scenario data (SD) are stored in the server (3) as 3D message information (MD). When access information to the 3D message information (MD) is notified from the mobile phone (1) to a mobile phone (2), the mobile phone (2) makes access to the server (3) to download the 3D message information (MD) and a necessary 3D font. 3D character mail is thereby reproduced in the mobile phone (2).

19 Claims, 6 Drawing Sheets

(56) References Cited

U.S. PATENT DOCUMENTS

| | | | |
|---|---|---|---|
| 7,386,799 B1* | 6/2008 | Clanton et al. | 715/758 |
| 2001/0007451 A1* | 7/2001 | Aono | 345/442 |
| 2001/0034783 A1 | 10/2001 | Kitamura | |
| 2002/0010725 A1 | 1/2002 | Mo | |
| 2002/0090935 A1 | 7/2002 | Anzai | |
| 2002/0105515 A1 | 8/2002 | Mochizuki | |
| 2003/0061566 A1* | 3/2003 | Rubstein et al. | 715/500.1 |
| 2003/0110450 A1 | 6/2003 | Sakai | |
| 2003/0154446 A1 | 8/2003 | Constant et al. | |
| 2003/0236836 A1* | 12/2003 | Borthwick | 709/204 |
| 2004/0064511 A1* | 4/2004 | Abdel-Aziz et al. | 709/206 |
| 2004/0193638 A1 | 9/2004 | Taniguchi et al. | |
| 2011/0055440 A1 | 3/2011 | Sakai | |
| 2011/0055674 A1 | 3/2011 | Sakai | |
| 2011/0055675 A1 | 3/2011 | Sakai | |

FOREIGN PATENT DOCUMENTS

| | | | |
|---|---|---|---|
| EP | 1 111 883 A2 | 6/2001 | |
| GB | 2 348 082 A | 9/2000 | |
| JP | 6-162167 | 6/1994 | |
| JP | 10-149354 | 6/1998 | |
| JP | 11-177614 | 7/1999 | |
| JP | 11-328054 | 11/1999 | |
| JP | 2000-276419 | 10/2000 | |
| JP | 2001-101173 | 4/2001 | |
| JP | 2001-209593 | 8/2001 | |
| JP | 2001-222476 A | 8/2001 | |
| JP | 2001-245340 | 9/2001 | |
| JP | 2002-16656 | 1/2002 | |
| JP | 2002-024142 | 1/2002 | |
| JP | 2002-024142 A * | 1/2002 | G06F 13/00 |
| JP | 2002-73480 | 3/2002 | |
| JP | 2002-163194 | 6/2002 | |
| JP | 2002-207671 | 7/2002 | |
| JP | 2002-342234 | 11/2002 | |
| JP | 2003-51029 | 2/2003 | |
| JP | 2003-67302 | 3/2003 | |
| JP | 2003-150489 | 5/2003 | |
| JP | 2004-234614 | 8/2004 | |
| JP | 2005-512231 | 4/2005 | |
| WO | 02/21287 | 3/2002 | |
| WO | 02/46934 | 6/2002 | |
| WO | 02/100121 A2 | 12/2002 | |
| WO | 03/042818 A1 | 5/2003 | |
| WO | 03/050645 A2 | 6/2003 | |
| WO | WO 03/050696 A1 | 6/2003 | |

OTHER PUBLICATIONS

Khare R., Bitstream portable font resources for Web pages, Feb. 20, 1997, retrieved from http://www.xent.com/FoRK-archive/winter96/0524.html on May 1, 2009.*
http://www.sonyericsson.co.jp/product/docomo/premini2/function.html (with Partial English Translation).
Chinese Office Action Issued Feb. 4, 2013 in Patent Application No. 200910004375.4 (with English and Japanese translaions).
Office Action issued May 28, 2012 in Chinese Application No. 200910004375.4 (With English Translation).
Office Action issued Jun. 12, 2012 in Japanese Patent Application No. 2010-135058 with partial English language translation.
Japanese Office Action issued Aug. 28, 2012, in Japan Patent Application No. 2010-135058 (with Partial English translation).
http://www.sonyericsson.co.ip/product/docomo/premini2/function.html (with Partial English Translation).
http://www.incredimail.com/english/.

* cited by examiner

3D CHARACTER MAIL SYSTEM

TECHNICAL FIELD

The present invention relates to a technique for contents creation and transmission of e-mail.

BACKGROUND ART

E-mail through the use of mobile phones has the advantage that users can easily exchange messages anywhere at any time. In e-mail through the use of mobile phones, messages using icons in addition to text characters are exchanged. As mobile phones become more sophisticated in functionality, it has become possible to exchange messages containing simple images and color images.

A mobile phone that allows exchange of dynamic messages in which characters are moving are introduced in the following non-patent document 1. In this manner, attempts are being made to enrich expression of e-mail through the use of mobile phones by various methods.

Further, the following non-patent document 2 achieves expression of three-dimensional (3D) contents using two-dimensional (2D) animation as e-mail contents.

Non-Patent Document 1:
http://www.sonyericsson.co.jp/product/docomo/so505i/planet.html
Non-Patent Document 2:
http://www.incredimail.com There has been a growing demand for increased variety of expression in an e-mail message through the use of mobile phones. Where mobile phones are playing an important role as one of communications tools, it is very useful to enrich expression of e-mail.

The above non-patent document 2 allows exchange of e-mail using characters visually giving 3D expression, however, contents being actually exchanged are 2D animation data. In such service, characters are only given predetermined motion, and, even if a user creates materials themselves for 2D animation, it is practically very difficult for an ordinary person to create 2D animation data with a small terminal such as a mobile phone. As a result, contents created by individual users result in very similar ones, which is difficult to express their own individualities, and has a fault in losing interest quickly.

DISCLOSURE OF INVENTION

It is an object of the present invention to provide a technique for enriching expression of an e-mail message as well as allowing a user to easily express his/her own individuality.

The present invention is a system for reproducing electronic mail created in a first terminal, in a second terminal. The first terminal includes means for generating instruction information for expressing an input text message using a 3D font and transmitting the text message and instruction information to a server. The server includes: means for storing a 3D font; means for generating control information about a 3D font for expressing the text message on the basis of the received instruction information; and means for storing the received text message and generated control information as 3D message information. The first terminal further includes means for transmitting access path information to the 3D message information stored in the server to the second terminal. The second terminal includes means for making access to the server on the basis of the access path information received from the first terminal and download the 3D message information and a corresponding 3D font, thereby reproduce 3D character mail.

In an another aspect, the present invention is a system for reproducing electronic mail created in a first terminal, in a second terminal. The first terminal includes: means for storing a 3D font; means for generating control information about a 3D font for expressing an input text message; and means for transmitting the text message, generated control information and a 3D font used to express the text message, to a server. The server includes means for storing the received text message and control information as 3D message information as well as storing the received 3D font. The first terminal further includes means for transmitting access path information to the 3D message information stored in the server, to the second terminal. The second terminal includes means for making access to the server on the basis of the access path information received from the first terminal and download the 3D message information and a corresponding 3D font, to reproduce 3D character mail.

According to the present invention, the system can be constructed with a high degree of flexibility in creation and reproduction of 3D character mail. Besides, it is possible to create highly original message contents with simple operations using limited resources of a terminal.

Further, a 3D font and control information thereof are each handled as independent data as information for reproducing 3D character mail, and 3D character mail is reproduced by exchanging these data. Accordingly, the system configuration has a great potential for expansion.

In a still another aspect, the present invention is a system for reproducing electronic mail created in a first terminal, in a second terminal. The first terminal includes: means for storing a 3D font; means for generating control information about a 3D font for expressing an input text message; and means for transmitting the text message, the generated control information and the 3D font used to express the text message, to the second terminal. The second terminal includes means for reproducing 3D character mail on the basis of the text message, the control information and the 3D font received from the first terminal.

The present invention achieves a configuration that requires no server, which can simplify the process of transmitting 3D character mail.

These and other objects, features, aspects and advantages of the present invention will become apparent from the following detailed description and the accompanying drawings.

BEST MODE FOR CARRYING OUT THE INVENTION

First, definitions for terms necessary to describe the present invention are established. Throughout the present specification, a "3D font" means model data representing a stereoscopic three-dimensional structure. The form and motion of this model data are determined with the supply of control information. The "3D character mail system" according to the present invention allows reproduction of e-mail in 3D graphics by applying a "3D font" to characters used in a "text message". Throughout the present specification, the "text message" includes Japanese or foreign language characters or the like as well as numbers, symbols, icons and the like. In other words, the "text message" includes every information transmission data that are previously assigned specific codes in the system and that can be input into the body of e-mail by a key input operation or the like.

First Embodiment

Figure 1:
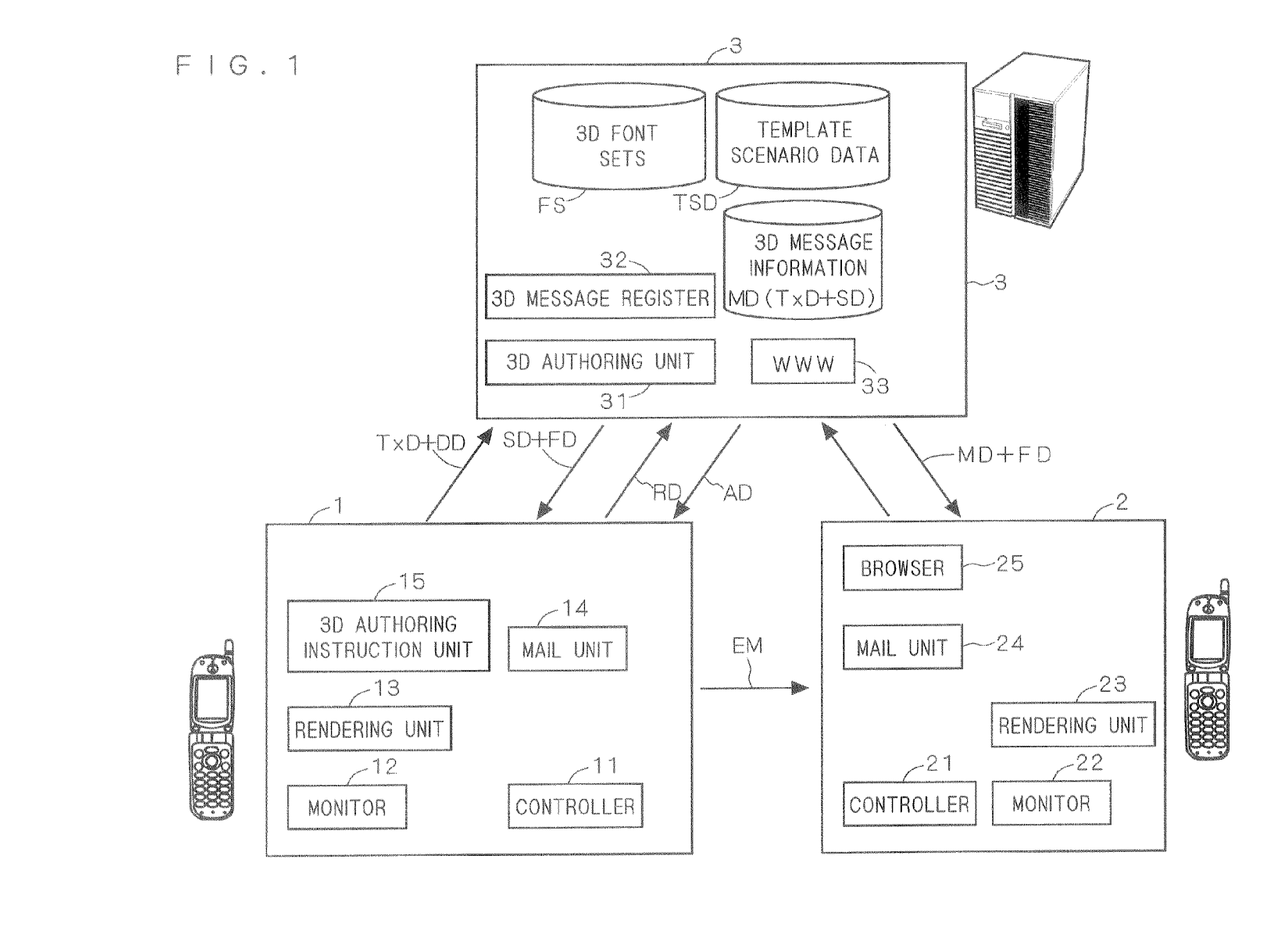
[FIG. 1] is a diagram showing a 3D character mail system according to a first embodiment.

Hereinafter, embodiments of the present invention will be described with reference to the drawings. FIG. 1 is a diagram showing a 3D character mail system according to a first embodiment of the present invention. The 3D character mail system includes two mobile phones 1, 2 and a server 3. The mobile phones 1 and 2 are both provided with data communication capability as well as voice communication capability. Accordingly, the mobile phones 1 and 2 can each exchange e-mail with another mobile phone. The server 3 is a computer capable of making data communications with the mobile phones 1 and 2. The server 3 may be connected to a data communication network for mobile phones, or may be connected to another network (e.g., the Internet) connected to the data communication network.

Hereinafter, the mobile phone 1 is described as a terminal for creating 3D character mail, and the mobile phone 2 is described as a terminal for reproducing the 3D character mail. Accordingly, description of the mobile phone 1 is only directed to functions necessary for creating 3D character mail, and description of the mobile phone 2 is only directed to functions necessary for reproducing the 3D character mail. Actually the mobile phones 1 and 2 both have these functions for creation and reproduction, and thus can transmit receive 3D character mail to/from each other.

The mobile phones 1 and 2 have controllers 11, 21, monitors 12, 22, rendering units 13, 23, and mail units 14, 24, respectively. The controllers 11 and 21 are each composed of various buttons. Users of the mobile phones 1 and 2 can input e-mail messages by operating the controllers 11 and 21. By operating the controllers 11, 21, the users can give instructions for various operations to the mobile phones 1 and 2 such as an e-mail transmission instruction and an e-mail receive-and-display instruction. The monitors 12 and 22 display an input message or e-mail contents received from the other's terminal. The rendering units 13 and 23 have the function of reproducing a 3D object to output it to the monitors 12 and 22. With the rendering units 13 and 23, the mobile phones 1 and 2 are capable of reproducing 3D graphics on the basis of a 3D font and information for controlling the 3D font The mail units 14 and 24 have the functions of creating e-mail, transmitting the created e-mail to the other's terminal, receiving an e-mail transmitted from the other's terminal, and the like.

The mobile phone 1 further has a 3D authoring instruction unit 15. In the present embodiment, the mobile phone 1 does not posses a 3D font in its own terminal. Accordingly the mobile phone 1 does not create 3D graphics in its own terminal. The mobile phone 1 gives an instruction to create 3D character mail, i.e., 3D graphics to the server 3 through the 3D authoring instruction unit 15.

Meanwhile, the mobile phone 2 has a browser 25. The browser 25 is used in acquiring information about 3D character mail.

Next, the server 3 is described. The server 3 stores 3D font sets FS and template scenario data TSD in a memory such as a hard disk. The server 3 has a plurality of types of 3D font sets FS, and is accordingly capable of creating various types of 3D character mail. The template scenario data TSD is data for determining the style of 3D character mail A person who creates 3D character mail can freely and individually determine the type of 3D font set FS (i.e. font type), 3D font motion (movement, rotation, speed, etc.), 3D font color, 3D font morphing information and 3D font scaling rate. Through the use of the template scenario data TSD, the style of 3D character mail can easily be specified on the basis of a certain theme or motif. For instance, using scenario template data TSD entitled "pleasure version", 3D character mail with a bright and happy feeling can easily be created. Using scenario template data TSD entitled "disappointment version", 3D character mail representing a disappointed feeling can easily be created.

The server 3 further has a 3D authoring unit 31. When authoring instruction data DD is transmitted from the 3D authoring instruction unit 15 of the mobile phone 1, the 3D authoring unit 31 generates scenario data SD (control information about a 3D font) on the basis of the received authoring instruction data DD. This scenario data SD is data describing parameters specified for a 3D font in the form of a 3D object. More specifically, the scenario data SD contains information for specifying the type of 3D font set FS (i.e., font type) and parameters specified for the 3D font. The 3D font motion (movement, rotation, speed, etc.) 3D font color 3D font morphing information and 3D font scaling rate are specified as parameters.

When the authoring instruction data DD received from the 3D authoring instruction unit 15 of the mobile phone 1 contains an instruction to use the template scenario data TSD, the template scenario data TSD is used as the scenario data SD.

A 3D message register 32 provided for the server 3 stores text data TxD received from the mobile phone 1 and the generated scenario data SD in a memory as 3D message information MD. The 3D message register 32 has the function of transmitting access path information AD allowing access to the 3D message information MD to the mobile phone 1 In the present embodiment, the web shall be used as a method to make access to the 3D message information MD Accordingly, URL is used as the access path information AD.

Next, the flow of processes from creation to reproduction of 3D character mail is described. First, a user of the mobile phone 1 operates the controller 11 to input text data TxD. The user further gives a 3D authoring instruction as to each text character. More specifically, the user operates the settings for each text character as to such as which 3D font is to be used, how the 3D font is to be moved and rotated, which color the 3D font has, how the 3D font morphs, in which size (scaling rate) the 3D font is to be displayed (information created by these settings is called authoring instruction data DD). Alternatively, the user may use a template. For instance, selecting the aforementioned template entitled "pleasant version" or "disappointment version", the authoring operation can easily be carried out. Information about a template being used, if any, is contained in the authoring instruction data DD.

When the above operation is carried out, the 3D authoring instruction unit 15 transmits the input text data TxD and the authoring instruction data DD to the server 3.

Next, in the server 3, the 3D authoring unit 31 receives the text data TxD and authoring instruction data DD to generate scenario data SD as information for controlling a 3D font In a terminal having the rendering function, 3D character mail in 3D graphics can be reproduced using the scenario data SD and 3D font.

Next, the 3D authoring unit 31 selects 3D font data FD necessary to be used in 3D character mail from among the 3D font sets FS, and transmits the selected 3D font data FD and the generated scenario data SD to the mobile phone 1. For instance, when the same character occurs repeatedly in the text data TxD, and when the same 3D font type is specified as to the repeatedly occurring character, it is sufficient to transmit only one piece of 3D font data FD for that character.

In the mobile phone 1, the rendering unit 13 reproduces the 3D character mail on the basis of the received 3D font data FD and scenario data SD and the input text data TxD. The reproduced 3D character mail is output to the monitor 12. Accordingly, the user of the mobile phone 1 can previously acknowledge a reproduced state of 3D character mail before transmission of the 3D character mail. The user can make a necessary correction looking at the reproduced state of the 3D character mail. If he/she satisfies the reproduced state, a registering operation is carried out. Registration instruction data RD is thereby transmitted to the server 3.

In the server 3, the 3D character message register 32 receives the registration instruction data RD, and stores the scenario data SD generated by the 3D authoring unit 31 and the text data TxD received from the mobile phone 1 in a memory such as a hard disk as 3D message information MD. At this time, the 3D message register 32 stores the 3D message information MD in a predetermined directory in a web-accessible manner Further, the 3D message register 32 specifies an access path (URL) to make access to the 3D message information MD, and transmits the access path information AD to the mobile phone 1.

In the mobile phone 1, the 3D authoring instruction unit 13 receives the access path information AD, and then notifies the mail unit 14 of this information. The mail unit 14 transmits an e-mail EM describing the access path information AD in the body of the mail to the mobile phone 2.

In the mobile phone 2, the mail unit 24 receives the e-mail EM, and then, notifies the browser 25 of the access path information AD described in the e-mail EM. The browser 25 specifies the URL described in the access path information AD to make access to a www server 33 in the sever 3. The www server 33 transmits the 3D message information MD stored in the specified URL and necessary 3D font data FD to the mobile phone 2. In this manner, the browser 25 downloads the 3D message information MD (text data TxD+scenario data SD) and 3D font data FD necessary for reproduction of the 3D character mail.

The scenario data SD and 3D font data FD are transmitted from the server 3 to the mobile phone 2 after encryption. This prevents the mobile phone 2 from using the 3D font data FD as is for another use, so that a copyright on the 3D font can be secured.

Next, the rendering unit 23 of the mobile phone 2 reproduces the 3D character mail on the basis of the downloaded text data TxD, scenario data SD and 3D font data FD. The reproduced 3D character mail is displayed on the monitor 22.

In this manner, the mobile phone 2 can reproduce the 3D character mail instructed to create by the mobile phone 1. According to the present embodiment, the mobile phones 1 and 2 can exchange 3D character mail using the server 3 without having 3font sets FS in their own terminals.

According to the present invention the sender's mobile phone 1 creates 3D graphics on the basis of the 3D font data FD and scenario data SD, and is therefore capable of creating 3D character mail relatively easily through the use of authoring tools. For instance, the creating operation is easier than in the case of creating 3D contents using a 2D animation technique. Further, the receiver's mobile phone 2 reproduces 3D graphics on the basis of the 3D font data FD and scenario data SD, which allows an increase in flexibility in reproducing the 3D character mail. Specifically, in the case of contents with 2D animation converted from 3D graphics, only that animation can be reproduced on the receiver's side. However, receiving a 3D font in the form of a 3D object and control information to that 3D object as independent data allows the receiver's side to construct a system for modifying the motion and form changing of the 3D object.

Figure 6:
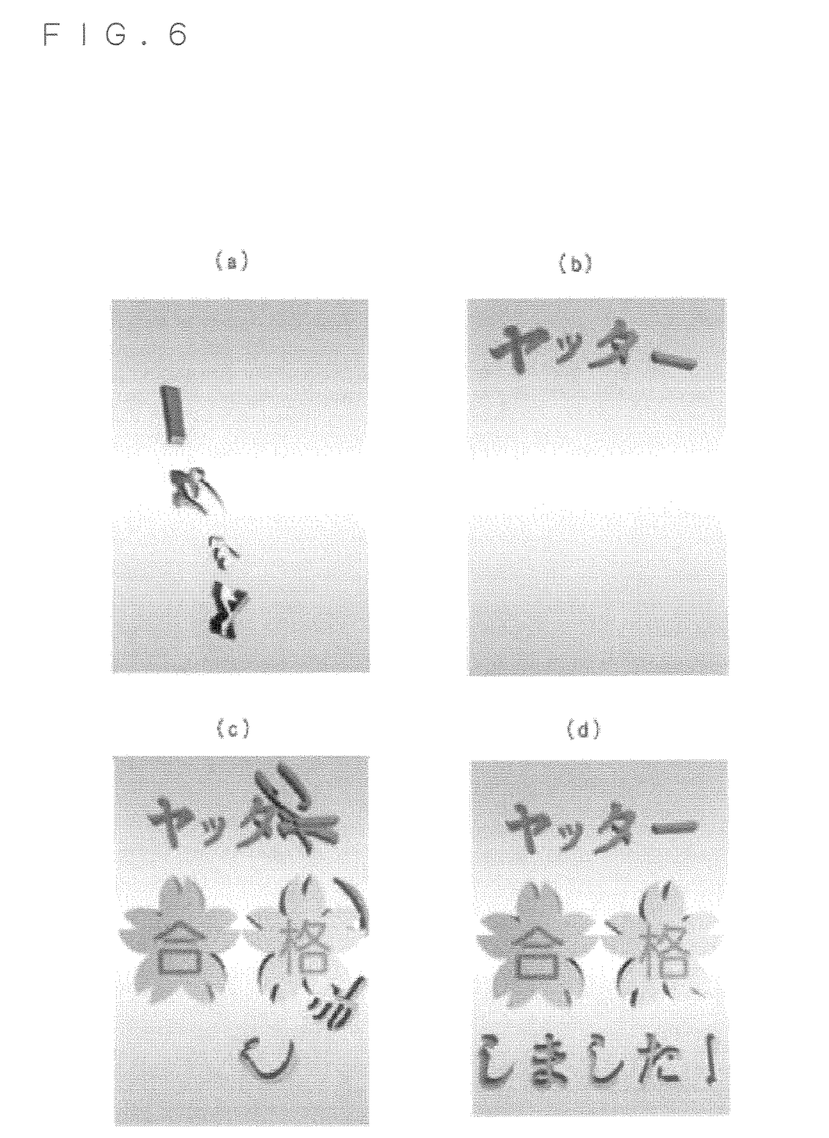
[FIG. 6] shows reproduced states in a 3D character mail system.

FIG. 6 shows display images of 3D character mail by way of example. Each diagram shows 3D character mail about successful completion of examination. First, the display (a) shows a state wherein 3D characters meaning "WOW" appearing from the right side of the display while rotating clockwise. The display (b) shows a state wherein the 3D characters meaning "WOW" moving toward the upper part of the displays. The screen (c) shows a state wherein characters meaning "PASS" additionally displayed at the center of the display and 3D characters meaning "HAS BEEN GOT" appearing from the right side of the display and moving clockwise. The display (d) shows a state wherein the 3D characters meaning "HAS BEEN GOT" moved to the lower part of the display and displayed there. As the screen progresses from (c) to (d) the 3D characters meaning "HAS BEEN GOT" morph. Exchange of such 3D character mail allows message exchange enriched in expression more than ever.

Using the present system, how an individual 3D message a user can create while using template scenario data TSD is now discussed. First a user selects one piece of previously provided template scenario data TSD according to the characteristics of the entire message. In the above case, a template entitled "pleasure version: rotation morphing" is selected, for example. Thereafter, text data TxD is input as follows

WOW

PASS

HAS BEEN GOT

Such simple operation allows creation of 3D animation in which the respective rows appear from the right side of the display and reach certain positions while rotating and morphing. To enhance the characters meaning "PASS", characters input in Hiragana are converted to "PASS" in kanji in a 3D font in the same style as usual kana-to-kanji conversion. In this system, final scenario data SD is generated giving higher priority to this authoring command inherently specified by a user than the template scenario data TSD. Therefore, the characters meaning "PASS" do not follow a default movement of rotation morphing defined by a template scenario, but are displayed in motion inherently assigned to the 3D font (e.g., the first kanji character appears from the left side, and the other one appears from the right side, and these characters are spaced within the center of the display after being hit by each other).

The present system does not create 2D animation, but creates reproducible 3D character mail using the 3D rendering function provided for a terminal. This eliminates the need to reproduce all images that reflect changes as in the case of 2D animation, and edits as described above can be made merely by modifying scenario data and font information to be used. As described, since a user can freely edit necessary portions alone while using a given template, an infinitely wider variety of messages can easily be created than in the case of using 2D animation that can only display predetermined motion.

Second Embodiment

Figure 2:
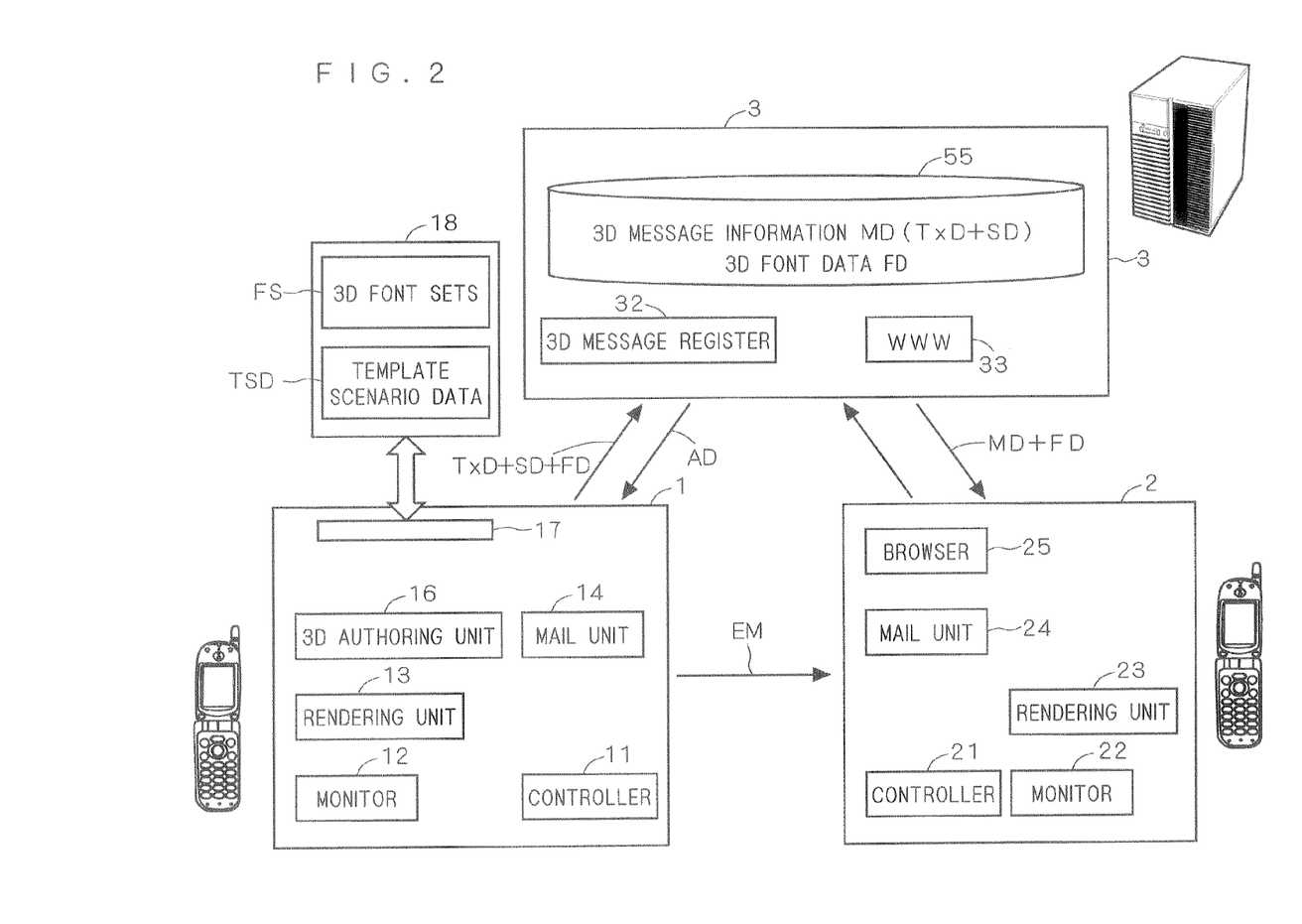
[FIG. 2] is a diagram showing a 3D character mail system according to a second embodiment.

Next, a second embodiment is described. FIG. 2 is a diagram showing a 3D character mail system according to the second embodiment. Similarly to the system according to the first embodiment, the 3D character mail system includes the two mobile phones 1, 2 and server 3. Functional components and processes different from those in the first embodiment will be discussed below.

In the second embodiment, the mobile phone 1 has 3D font sets FS and template scenario data TSD. The mobile phone 1 is equipped with an interface 17 to a recording medium 18 removably attached to the body of the terminal, and is capable of making access to various kinds of data stored in the recording medium 18. As the recording medium 18, a flash memory and the like can be adopted, for example. On the other hand, according to the present embodiment, the server 3 is not required to have 3D font sets FS and template scenario data TSD.

The mobile phone 1 further has a 3D authoring unit 16. In this embodiment, the mobile phone 1 has a 3D font, and therefore, executes creation of 3D graphics using the 3D font data FD in its own terminal.

Next, the flow of processes from creation to reproduction of 3D character mail is described. First, a user of the mobile phone 1 operates the controller 11 to input text data TxD. The user further gives a 3D authoring instruction as to each text character. Specifically, the user operates the settings for each text character as to such as which 3D font is to be used, how the 3D font is to be moved and rotated, which color the 3D font has, how the 3D font morphs, in which size (scaling rate) the 3D font is to be displayed. Alternatively, the user may use a template. For instance, selecting the aforementioned template entitled "pleasant version" or "disappointment version", the authoring operation can easily be carried out.

After the user gives the 3D authoring instruction, the 3D authoring unit 16 generates scenario data SD as well as creating 3D character mail. The created 3D character mail is displayed on the monitor 12. The user can make a necessary correction looking at the reproduced state of the 3D character mail. If he/she satisfies the reproduced state, a registering operation is carried out. When the registering operation is carried out, the 3D authoring unit 16 transmits the input text data TxD, generated scenario data SD and 3D font data FD necessary for the 3D character mail to the server 3. The 3D font data FD is selected from among the 3D font sets FS In the server 3, the 3D character message register 32 stores the received text data TxD and scenario data SD in a memory as 3D message information MD, as well as storing the 3D font data FD received from the mobile phone 1 in the memory. At this time, the 3D message register 32 stores the 3D message information MD in a predetermined directory in a web-accessible manner. Further, the 3D message register 32 specifies an access path (URL) to the 3D message information MD, and transmits the access path information AD to the mobile phone 1.

In the mobile phone 1, the 3D authoring unit 16 receives the access path information AD, and then, notifies the mail unit 14 of this information. The mail unit 14 transmits an e-mail EM describing the access path information AD in the body of the mail to the mobile phone 2.

In the mobile phone 2, the mail unit 24 receives the e-mail EM, and then, transmits the access path information AD described in the e-mail EM to the browser 25 The browser 25 specifies URL described in the access path information AD to make access to the www server 33 in the sever 3. The www server 33 transmits the 3D message information MD stored in the specified URL and 3D font data FD to the mobile phone 2.

In this manner, the browser 25 downloads the 3D message information MD (text data TxD+scenario data SD) and 3D font data FD necessary for reproduction of the 3D character mail.

The scenario data SD and 3D font data FD are transmitted from the server 3 to the mobile phone 2 after encryption. This prevents the mobile phone 2 from using the 3D font data as is for another use, so that a copyright on the 3D font can be secured.

Next, the rendering unit 23 of the mobile phone 2 reproduces the 3D character mail on the basis of the downloaded text data TxD and scenario data SD, and the 3D font data FD. The reproduced 3D character mail is displayed on the monitor 22.

In this manner, the mobile phone 2 can reproduce the 3D character mail instructed to create by the mobile phone 1. According to the present embodiment, the mobile phone 1 transmits needed 3D font, and the mobile phone 2 thereby reproduces 3D character mail without having 3D font sets FS.

Third Embodiment

Figure 3:
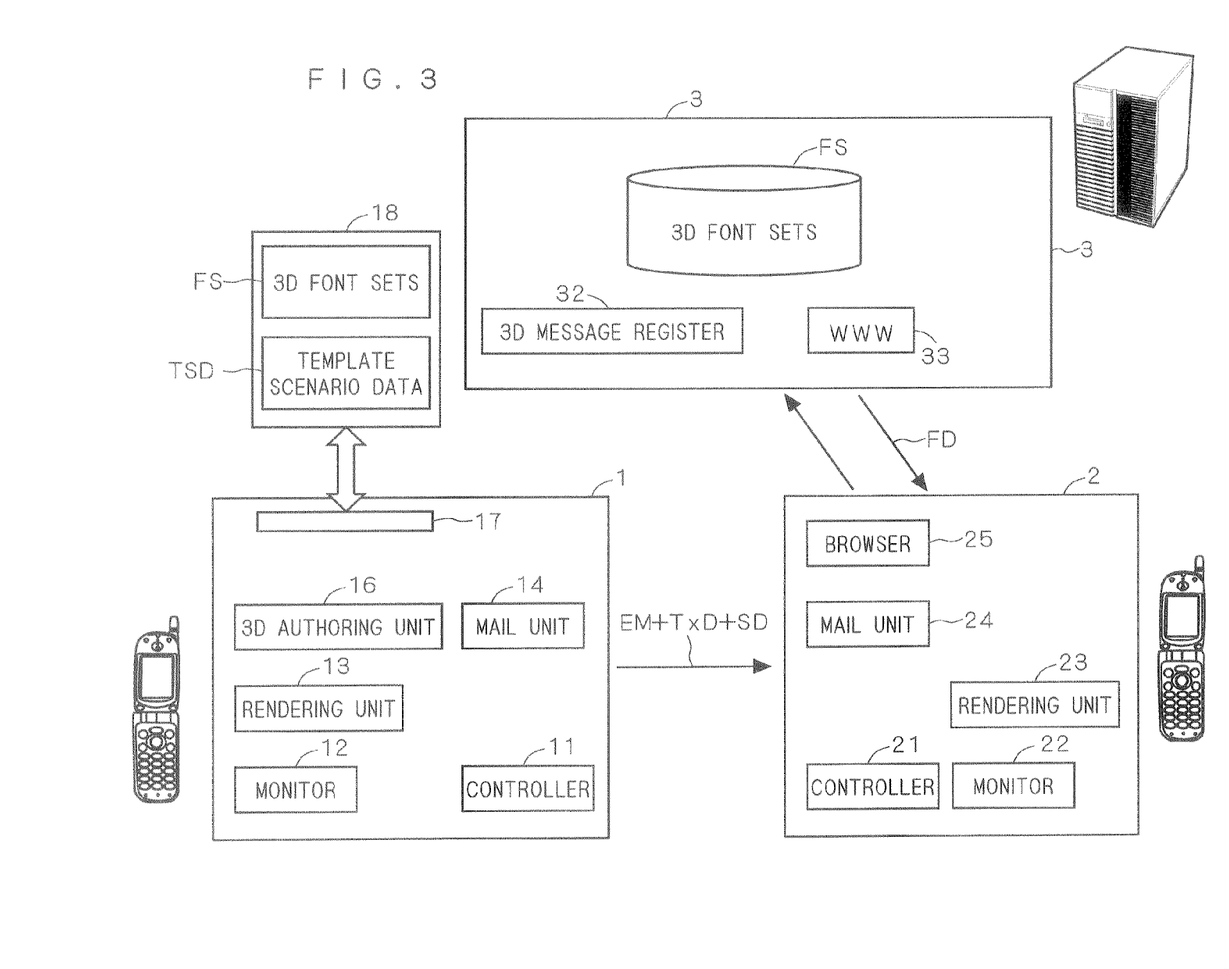
[FIG. 3] is a diagram showing a 3D character mail system according to a third embodiment.

Next, a third embodiment is described. FIG. 3 is a diagram showing a 3D character mail system according to the third embodiment. Similarly to the systems according to the first and second embodiments, the 3D character mail system includes the two mobile phones 1, 2 and server 3. Functional components and processes different from those in the first and second embodiments will be discussed below.

In the third embodiment, the mobile phone 1 has 3D font sets FS and template scenario data TSD. On the other hand, the server 3 has 3D font sets FS. In this embodiment, the mobile phone 1 has a 3D font, and therefore, executes creation of 3D graphics using the 3D font data FD in its own terminal.

Next, the flow of processes from creation to reproduction of 3D character mail is described. First, a user of the mobile phone 1 operates the controller 11 to input text data TxD. The user further gives a 3D authoring instruction as to each text character. Specifically, the user operates the settings for each text character as to such as which 3D font is to be used, how the 3D font is to be moved and rotated, which color the 3D font has, how the 3D font morphs, in which size (scaling rate) the 3D font is to be displayed. Alternatively, the user may use a template. For instance, selecting the aforementioned template entitled "pleasant version" or "disappointment version", the authoring operation can easily be carried out.

After the user gives the 3D authoring instruction, the 3D authoring unit 16 generates scenario data SD as well as creating 3D character mail The created 3D character mail is displayed on the monitor 12. The user can make a necessary correction looking at the reproduced state of the 3D character mail. If he/she satisfies the reproduced state, the user gives the mail unit 14 an instruction to transmit the 3D character mail. An e-mail EM with the input text data TxD and generated scenario data SD attached is thereby transmitted to the mobile phone 2.

In the mobile phone 2, the mail unit 24 receives the e-mail EM, and then, acquires the text data TxD and scenario data SD attached to the e-mail EM. The mobile phone 2 then analyzes the earned text data TxD and scenario data SD to specify necessary font data FD. Then, the browser 25 makes an acquisition requirement specifying the necessary font data FD to the www server 33 in the sever 3. Access information for acquiring 3D font sets FS stored in the server 3 may be constant one. In that case, the mobile phone 2 using the present system may previously be provided with access information. Alternatively, the e-mail EM transmitted from the mobile phone 1 may describe access information.

The www server 33 acquires the specified 3D font data FD from among the 3D font sets FS stored in the memory, and transmits the acquired 3D font data FD to the mobile phone 2. In this manner, the browser 25 downloads the 3D font data FD necessary for reproduction of the 3D character mail.

The 3D font data FD is transmitted from the server 3 to the mobile phone 2 after encryption. This prevents the mobile phone 2 from using the 3D font data as is for another use, so that a copyright on the 3D font can be secured.

Next, the rendering unit 23 of the mobile phone 2 reproduces the 3D character mail on the basis of the text data TxD and scenario data SD received from the mobile phone 1, and the downloaded 3D font data FD. The reproduced 3D character mail is displayed on the monitor 22.

In this manner, the mobile phone 2 can reproduce the 3D character mail instructed to create by the mobile phone 1. According to the present embodiment, the mobile phone 2 can reproduce 3D character mail by downloading a necessary 3D font from the server 3 without having 3D font sets FS.

Fourth Embodiment

Figure 4:
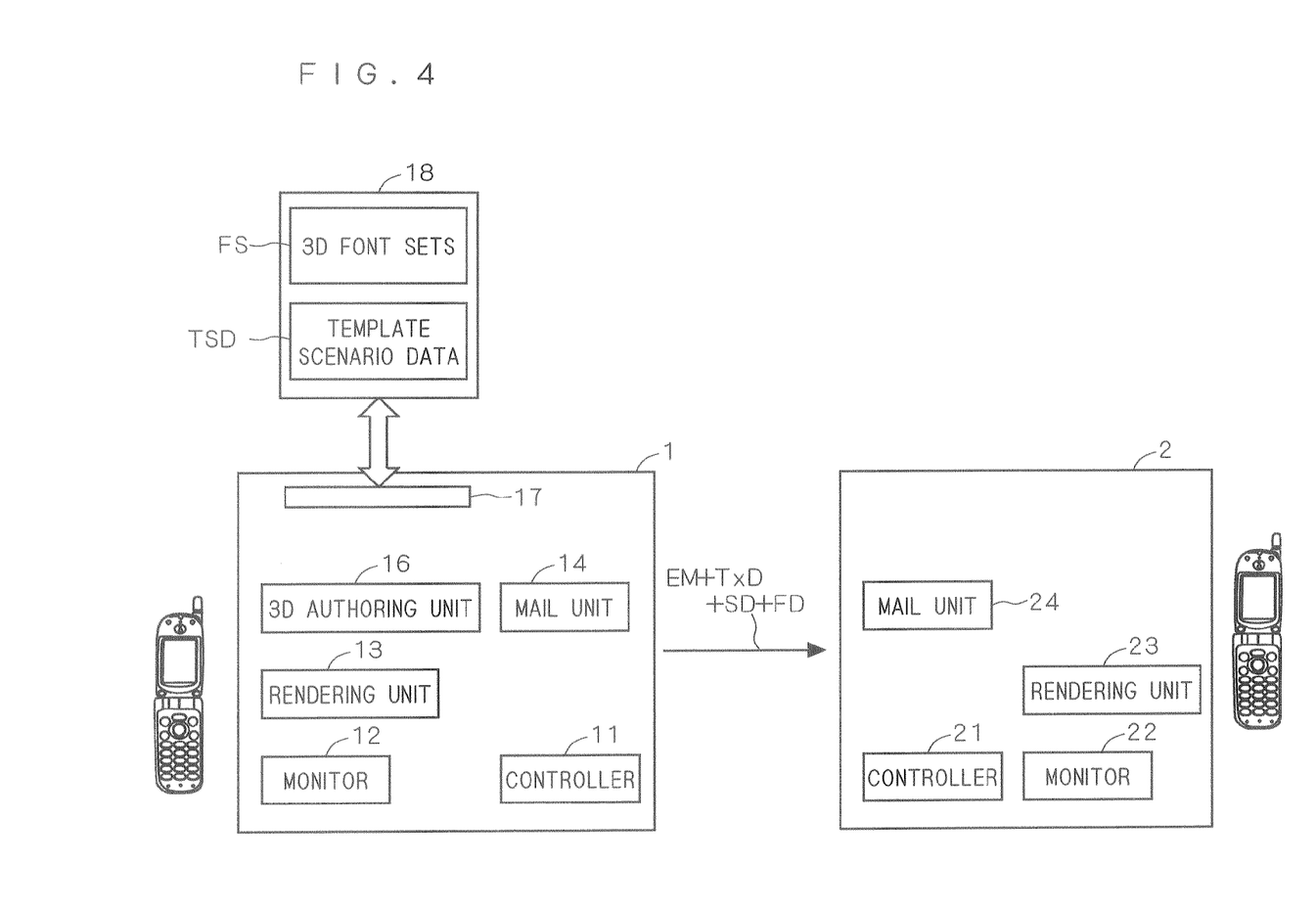
[FIG. 4] is a diagram showing a 3D character mail system according to a fourth embodiment.

Next, a fourth embodiment is described. FIG. 4 is a diagram showing a 3D character mail system according to the fourth embodiment. Unlike the systems according to the first to third embodiments, the 3D character mail system according to this fourth embodiment does not require the server 3.

In the fourth embodiment, the mobile phone 1 is configured with 3D font sets FS and template scenario data TSD, similarly to the second and third embodiments. The mobile phone 1 is equipped with the interface 17 to the recording medium 18 removably attached to the body of the terminal, and is capable of making access to various kinds of data stored in the recording medium 18.

Next, the flow of processes from creation to reproduction of 3D character mail is described. First, a user of the mobile phone 1 operates the controller 11 to input text data TxD. The user further gives a 3D authoring instruction as to each text character. Specifically, the user operates the settings for each text character as to such as which 3D font is to be used, how the 3D font is to be moved and rotated, which color the 3D font has, how the 3D font morphs, in which size (scaling rate) the 3D font is to be displayed. Alternatively, the user may use a template. For instance, selecting the aforementioned template entitled "pleasant version" or "disappointment version", the authoring operation can easily be carried out.

After the user gives the 3D authoring instruction, the 3D authoring unit 16 generates scenario data SD as well as creating 3D character mail. The created 3D character mail is displayed on the monitor 12. The user can make a necessary correction looking at the reproduced state of the 3D character mail. If he/she satisfies the reproduced state, a transmission operation is carried out. When the transmission operation is carried out, the mail unit 14 transmits an e-mail EM to which the input text data TxD, generated scenario data SD and 3D font data FD necessary for the 3D character mail are attached, to the mobile phone 2. The 3D font data FD is selected from among the 3D font sets FS.

The scenario data SD and 3D font data FD are transmitted from the mobile phone 1 to the mobile phone 2 after encryption. This prevents the mobile phone 2 from using the 3D font data as is for another use, so that a copyright on the 3D font can be secured.

In the mobile phone 2, the mail unit 24 receives the e-mail EM, and then, acquires the text data TxD, scenario data SD and 3D font data FD necessary for reproduction of this 3D character mail attached to the e-mail EM.

Next, the rendering unit 23 of the mobile phone 2 reproduces the 3D character mail on the basis of the acquired text data TxD, scenario data SD and the 3D font data FD. The reproduced 3D character mail is displayed on the monitor 22.

In this manner, the mobile phone 2 can reproduce the 3D character mail instructed to create by the mobile phone 1. According to the present embodiment, transmission of a necessary 3D font from the mobile phone 1 allows the mobile phone 2 to reproduce 3D character mail without having 3D font sets FS.

Fifth Embodiment

Figure 5:
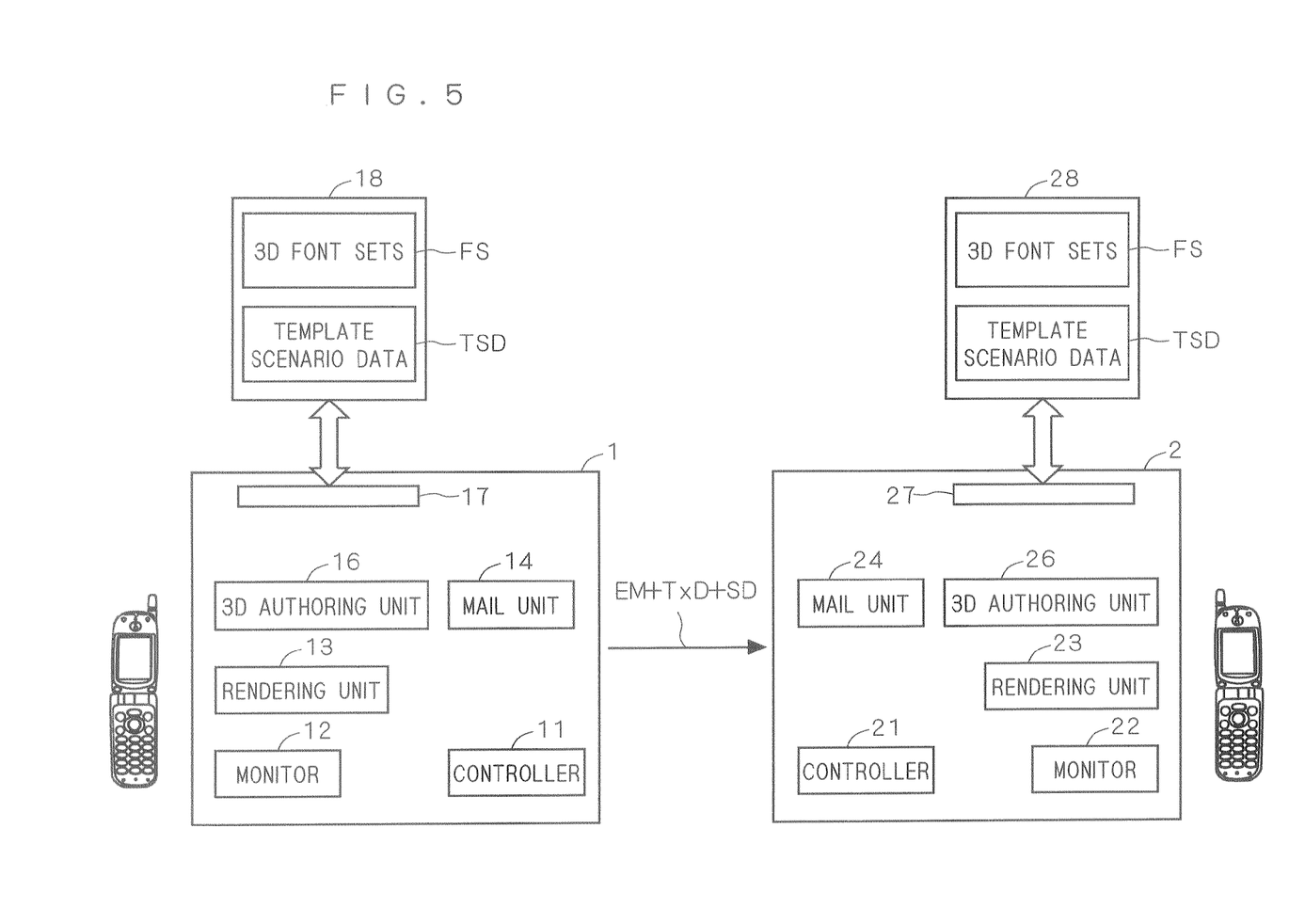
[FIG. 5] is a diagram showing a 3D character mail system according to a fifth embodiment.

Next, a fifth embodiment is described. FIG. 5 is a diagram showing a 3D character mail system according to the fifth embodiment. Unlike the systems according to the first to third embodiments, the 3D character mail system according to this embodiment does not require the server 3.

In the fifth embodiment, the mobile phone 1 is configured with 3D font sets FS and template scenario data TSD, similarly to the second to fourth embodimrents. The mobile phone 1 is equipped with the interface 17 to the recording medium 18 removably attached to the body of the terminal, and is capable of making access to various kinds of data stored in the recording medium 18.

Further, in this embodiment, the mobile phone 2 is configured with 3D font sets FS and template scenario data TSD. The mobile phone 2 is equipped with an interface 27 to a recording medium 28 removably attached to the body of the terminal, and is capable of making access to various kinds of data stored in the recording medium 28.

Next, the flow of processes from creation to reproduction of 3D character mail is described. First, a user of the mobile phone 1 operates the controller 11 to input text data TxD. The user further gives a 3D authoring instruction as to each text character Specifically, the user operates the settings for each text character as to such as which 3D font is to be used, how the 3D font is to be moved and rotated, which color the 3D font has, how the 3D font morphs, in which size (scaling rate) the 3D font is to be displayed. Alternatively, the user may, use a template, similarly to the other embodiments.

After the user gives the 3D authoring instruction, the 3D authoring unit 16 generates scenario data SD as well as creating 3D character mail. The created 3D character mail is displayed on the monitor 12. The user can make a necessary correction looking at the reproduced state of the 3D character mail. If he/she satisfies the reproduced state, a transmission operation is carried out. When the transmission operation is carried out, the mail unit 14 transmits an e-mail EM to which the input data TxD and generated scenario data SD are attached, to the mobile phone 2. Here, since the mobile phone 2 has 3D font sets FS, transmission of 3D font data FD necessary for the 3D character mail is not required. The scenario data SD is transmitted from the mobile phone 1 to the mobile phone 2 after encryption.

In the mobile phone 2, the mail unit 24 receives the e-mail EM, and then, acquires the text data TxD and scenario data SD attached to the e-mail EM.

Next, the rendering unit 23 of the mobile phone 2 reproduces the 3D character mail on the basis of the acquired text data TxD and scenario data SD, and the 3D font data FD stored in the recording medium 28 in its own terminal. The reproduced 3D character mail is displayed on the monitor 22.

In this manner, the mobile phone 2 can reproduce the 3D character mail instructed to create by the mobile phone 1. According to the present embodiment the mobile phone 1 does not need to transmit any 3D font because the mobile phone 2 has a 3D font.

Variation

Each of the above-described embodiments has described the system for exchanging 3D character mail by e-mail using mobile phones. The present invention is also applicable to an instant messenger. The mobile phones 1 and 2 in the above-described embodiments may be replaced with personal computers, respectively, to exchange 3D character mail by an instant messenger running on the personal computers. Of course, the present invention may be applied to general e-mail operated by personal computers. Further, the above embodiments have described the use of the web when the receiver's mobile phone 2 makes access to the server 3, however, the method to make access to the server 3 is not limited as such, but data may be acquired from the server 3 using other protocols.

Furthermore, the second to fourth embodiments have described storing the 3D font sets FS and template scenario data TSD in the removable recording medium 18 and 28, however, these data may be stored in a built-in memory if the mobile phones 1 and 2 can reserve sufficient built-in memories.

The invention claimed is:

1. A 3D character mail system for reproducing electronic mail, comprising:
   a first terminal to create 3D character mail by generating control information about a 3D font for expressing an input text message, and to transmit the text message and the generated control information to a second terminal without transmitting information related to the 3D character mail to a server, said control information being separate from the text message and independent of the 3D font, and including parameters for animating and creating a display appearance of the 3D font; and
   said second terminal to specify a 3D font necessary for reproducing the 3D character mail on the basis of the text message and the control information received from said first terminal, to download the specified 3D font from said server, and to reproduce the 3D character mail on the basis of the text message and the control information received from said first terminal and the 3D font downloaded from said server,
   wherein said first terminal further storing the 3D font and reproducing the 3D character mail on the basis of the input text message, the generated control information, and the 3D font stored in said first terminal, before transmitting the text message and generated control information to the second terminal.

2. The 3D character mail system according to claim 1, wherein said control information contains information specifying a font type of the 3D font to be used.

3. The 3D character mail system according to claim 1, wherein said control information contains a parameter for the 3D font to be used.

4. The 3D character mail system according to claim 1, wherein the 3D font transmitted to said second terminal is encrypted.

5. The 3D character mail system according to claim 1, wherein the control information transmitted to said second terminal is encrypted.

6. The 3D character mail system according to claim 1, wherein said text message contains an icon.

7. A 3D character mail system for reproducing electronic mail, comprising:
   a first terminal to create 3D character mail by generating control information about the 3D font for expressing an input text message, to store the 3D font, and to transmit the text message, the generated control information, and the 3D font used to express the text message, directly to a second terminal, said control information being separate from the text message and independent of the 3D font, and including parameters for animating and creating a display appearance of the 3D font; and
   said second terminal to reproduce the 3D character mail only on the basis of the text message, the control information and the 3D font received from said first terminal,
   wherein said first terminal further reproducing the 3D character mail on the basis of the input text message, the generated control information, and the 3D font stored in said first terminal, before transmitting the text message and generated control information to the second terminal.

8. The 3D character mail system according to claim 7, wherein
   said first terminal further reproducing the 3D character mail on the basis of the input text message, the generated control information and the 3D font, before transmitting the text message, the generated control information, and the 3D font to the second terminal.

9. The 3D character mail system according to claim 7, wherein said first terminal includes a recording medium removably attached to the body of the first terminal, and the 3D font to be used in the 3D character mail is stored in said recording medium and supplied.

10. The 3D character mail system according to claim 7, wherein said control information contains information specifying a font type of the 3D font to be used.

11. The 3D character mail system according to claim 7, wherein said control information contains a parameter for the 3D font to be used.

12. The 3D character mail system according to claim 7, wherein the 3D font transmitted to said second terminal is encrypted.

13. The 3D character mail system according to claim 7, wherein the control information transmitted to said second terminal is encrypted.

14. The 3D character mail system according to claim 7, wherein said text message contains an icon.

15. A 3D character mail system for reproducing electronic mail, comprising:
   a first terminal to create 3D character mail by generating control information about a 3D font for expressing an input text message, and to transmit the text message and the generated control information directly to a second terminal, said control information being separate from the text message and independent of a 3D font and including parameters for animating and creating a display appearance of the 3D font; and
   said second terminal to store the 3D font before receiving the text message and control information from the first terminal and to reproduce the 3D character mail only on the basis of the text message and the control information received directly from said first terminal and the 3D font stored in said second terminal,
   wherein said first terminal further storing the 3D font and reproducing the 3D character mail on the basis of the input text message, the generated control information, and the 3D font stored in said first terminal, before transmitting the text message and generated control information to the second terminal.

16. The 3D character mail system according to claim 15, wherein said second terminal includes a recording medium removably attached to the body of the second terminal, and the 3D font to be used in the 3D character mail is stored in said recording medium.

17. The 3D character mail system according to claim 15, wherein said control information contains information specifying a font type of the 3D font to be used.

18. The 3D character mail system according to claim 15, wherein the control information transmitted to said second terminal is encrypted.

19. The 3D character mail system according to claim 15, wherein said text message contains an icon.

* * * * *